United States Patent
Hintz, Jr.

[11] Patent Number: 5,459,942
[45] Date of Patent: Oct. 24, 1995

[54] NOTATION PLATE

[76] Inventor: Harry W. Hintz, Jr., R. D. #1 Box 132, Muncy, Pa. 17756

[21] Appl. No.: 354,104
[22] Filed: Dec. 6, 1994
[51] Int. Cl.⁶ ................................................. G01B 3/10
[52] U.S. Cl. ................................................ 33/768; 33/760
[58] Field of Search ........................... 33/760, 761, 768, 33/769, 770; 283/81

[56] References Cited

U.S. PATENT DOCUMENTS

| | | | |
|---|---|---|---|
| 2,914,269 | 11/1959 | Freeman | 33/760 X |
| 4,766,673 | 8/1988 | Bolson | 33/760 |
| 4,768,010 | 11/1988 | Dynan | 33/760 X |
| 4,947,867 | 8/1990 | Keeton | 283/81 |
| 5,079,851 | 1/1992 | Sill | 33/768 |

OTHER PUBLICATIONS

Donald T. Hull, Measuring Reminder, The Family Handyman, Oct. 1992, p. 59.

Primary Examiner—Alvin Wirthlin

[57] ABSTRACT

The invention is a single thickness metallic notation plate for use in combination with today's plastic cased measuring tapes. During manufacture, the metallic notation plate is pressed into a slightly concave shape. The concave surface is pressed against the tape case surface which ensures that the metal edges snug tightly to the tape perimeter for user-friendly contact. The plate is held in place by factory applied, paper protected adhesives. Notations are erased with a rubber eraser or by moistening the plate and rubbing off with finger pressure. When the plate surface becomes too scratched and unusable, it is stripped off and a new one is applied.

4 Claims, 1 Drawing Sheet

U.S. Patent     Oct. 24, 1995     5,459,942
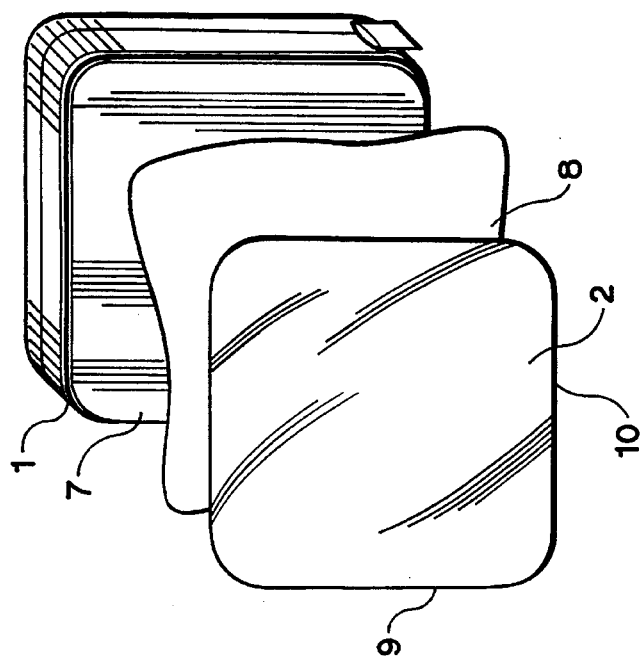
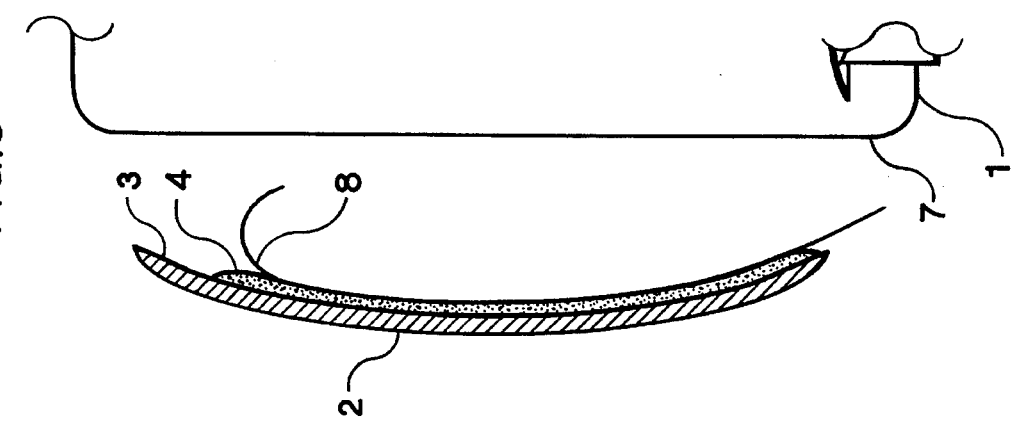
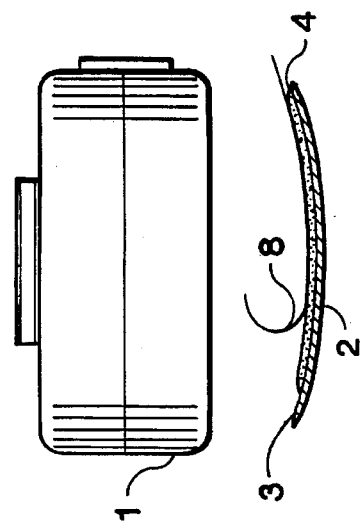
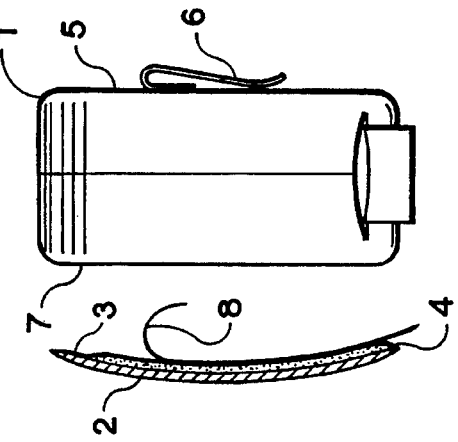

NOTATION PLATE

BACKGROUND OF THE INVENTION

This invention is designed to provide a replaceable notation plate for attachment to plastic housed self-winding and manual-winding measuring tapes.

It has been well-documented that the need exists for notation writing capacity on measuring tapes by mechanics in the construction field. Having been a general contractor in the home building business for the past 12 years, I have also seen the need and wonder why some or all of the devices found in the prior art are not in common use.

All of the devices found in the prior art are useful as presented, but there seem to be drawbacks when they are applied to the everyday work world where the devices would be used. Frequently, a mechanic uses a tool pouch to hold the tools and fasteners necessary to complete his/her job. The pouches being closed-bottomed containers, hold in addition to the sharp pointed tools and fasteners, dust, dirt, and grit with which the mechanic frequently comes in contact. If the measuring tapes would be stored in these pockets (which happens frequently) the dirty, gritty, sharp contents would quickly shorten the useful life of most of the prior art found. The patents issued utilizing transparent sheets with underlying recording plates, plastic discs for recording data, and plates on the measuring device slidable one on another, may quickly become torn, punctured, or fouled by the contents inherent in the environments where they frequently are used and stored between uses.

In all of the references cited (except U.S. Pat. No. 4,863,113) memoranda devices are integral with the measuring tape case. This means that when the notation capacity fails, one must purchase a new tape measure to again gain notation capacity. The replacement capacity of my patent application enables the tape measure itself to serve it's useful life separately from the notation plate. This capacity for replacement has not been addressed by the other patents cited.

Further, the cost of production of my notation plate is less than any of the prior art cited. This makes the notation plate in my application less expensive for the consumer to purchase, thus making it more obtainable for use by the general public.

U.S. Pat. No. 4,863,113 lists a writing tablet with an effacing medium storage pocket. In my opinion, the storage pocket would have the possibility of filling with the dirt and grit mentioned if stored between uses in the tool pouch, making it difficult to use. In addition, corian is listed as this patent's writing surface material. Corian would have a long service life if used as described, but it is fairly brittle with respect to sudden impact blows. If it were dropped from a common working height of 3' to 8' onto a hard surface it may crack and shatter. The pocket formed between the writing tablet and the outer flat surface of the measuring tape case further magnifies this possibility. Sandpaper is listed as the means of choice for cleaning the surface for additional notations. It should be pointed out that if the sandpaper were misplaced, it couldn't be used to efface the notation.

U.S. Pat. No. 2,914,269 most closely resembles my patent application, but it does differ significantly. One difference is the basic cross-section shape of my notation plate: mine has a concave side and a convex side. The plastic disc listed is "substantially flat." As will be pointed out in the summary, the concave-convex cross-section of my notation plate serves two (2) attachment functions and one (1) safety function. Additionally, the plastic disc in U.S. Pat. No. 2,914,269 is mounted permanently on the tape case with the flange of the rear bearing member retaining the pigmented plastic disc in position. This attachment method would seem to make it unreplaceable.

SUMMARY OF THE INVENTION

The invention is a thin (0.024" or less) single thickness metallic plate, the writing surface of which is coated with a light colored paint process. It is shaped width and lengthwise to fit onto the largest flat surface of todays plastic housed self-winding and manual-winding tape measures. The plate's shape in a cross-section view reveals a concave surface and a convex surface. The concave surface is mounted against the tape's largest flat surface (opposite the clip on self-winding tape measures or opposite the pop-out winding handle on 50' and 100' manual winding tapes (see 7)).

It is held in place on its concave surface against the tape measure utilizing factory applied paper protected (for shipment) adhesive. When the notation plate is to be put into use, the paper protective coveting on the adhesive is removed, and the notation plate is pressed onto the desired tape surface.

The concave shape of the mounting surface serves two (2) attachment functions and one (1) safety function. Being concave, the center of the plate is slightly higher after mounting on the measuring tape case than the perimeter of the notation plate. This allows for clearance in the center of the tape case for the flanges of through-extending rivets used by some tape manufacturers in the center of measuring tape cases. Additionally, when the concave surface of the metal notation plate is pressed onto the measuring tape case, the outer perimeter of the plate contacts the tape case before the more interior surface of the plate. This serves to ensure a user-friendly plate perimeter because it is downturned slightly into the tape case leaving very little edge to catch on the user's fingers or hands. In addition, the pressing action through the concave shape of the metal plate toward the flat tape face creates a suction force which magnifies the holding power of the adhesive over a strictly straight cross-section shape.

To remove the notation plate from the measuring tape for replacement, the tape measure housing is secured under foot or in a vice and a small putty knife is pried between the plate and the plastic tape housing. The plate is removed and a new one is pressed into place.

During use, the notation plate may be written upon with standard graphite pencil or ink pen. To erase the notation, the surface can be rubbed with an eraser, or moistened and rubbed off with finger pressure, then wiped clean on shirt sleeves or pants.

BRIEF DESCRIPTION OF THE DRAWINGS

There is one page of drawings:

FIG. 1 is a top view of the notation plate and premounting relationship with the tape measure housing, the notation plate shown in cross section;

FIG. 2 is a frontal view of the notation plate shown in cross section and its premounting relationship with the tape measure housing;

FIG. 3 is an enlarged view of the frontal view showing the notation plate in cross section, the applied adhesive, and the protective paper covering;

FIG. 4 is an angular perspective of the tape measure housing, the paper protective covering, and the notation plate before the paper protective covering is removed and the plate is pressed into position.

DESCRIPTION OF THE PREFERRED EMBODIMENTS

The invention (see FIGS. 1–4) is a light-colored painted metallic notation plate (2) which mounts with adhesives (4) onto the largest flat surface (7) of a measuring tape (1). The measuring tape with which the notation plate is combined has a two (2) piece plastic exterior shell held together by screws. Contained within the shell is either a coiled incremented measuring tape and spring combination (self-winding) or coiled incremented tape and exterior winding handle combination (manual-winding).

The metallic notation plate 2 is of single thickness construction, shaped width (9) and lengthwise (10) to fit onto the largest substantially flat surface (7) of the plastic bodied tape measure. The metallic notation plate has a concave semi-spherical first surface (3) and a convex semi-spherical second surface located opposite the first surface. The concave surface serves as the portion of the plate on which the adhesive (4) is applied. A paper protective covering (8) is installed on the adhesive to protect it before usage. Further, the concave surface is held in place on the substantially flat tape case surface through adhesive action in combination with suction action created by pressing the flexible concave plate surface (4) against the substantially flat exterior tape surface (7).

The convex surface of the notation plate serves as the notation area for whatever data the user desires. The plate can be removed for replacement using standard mechanical means (prying loose with screwdriver or putty knife).

Alterations could be made in the notation plate shape, composition, or fastening agent, but it would not depart from the intent of my notation plate. The claims should include such similar assemblies as long as they do not depart from this intent.

I claim:

1. A notation plate for use with a tape measure having a housing, said notation plate forming a concave semi-spherical first surface and a convex semi-spherical second surface opposite said first surface; said notation plate being flexible and having a uniform thickness; said first surface including an adhesive layer; the combination of said concave semi-spherical first surface and said adhesive layer creating a suction action between said notation plate and said tape measure housing when said notation plate is attached thereto; said second surface being adapted to receive markings thereon.

2. The notation plate of claim 1, wherein said plate is formed of metallic material.

3. The notation plate of claim 2, in combination with a tape measure having a housing; said housing being formed of plastic material; said metallic notation plate being attached to said plastic housing through said suction action.

4. The notation plate of claim 1, further including a removable paper covering said adhesive layer, whereby said adhesive layer is protected before usage.

\* \* \* \* \*